United States Patent Office 3,280,502

Patented Oct. 25, 1966

3,280,502

PROCESS FOR THE PREPARATION OF LUTEIN

Wendall Moore Farrow, Orange, and Benjamin Tabenkin, Montclair, N.J., assignors to Hoffmann-La Roche Inc., Nutley, N.J., a corporation of New Jersey No Drawing. Filed Nov. 7, 1962, Ser. No. 236,156
8 Claims. (Cl. 47—1.4)

This invention relates to a process for the preparation of lutein. More particularly, the invention relates to a process for preparing lutein from a culture of a thermophilic strain of the alga *Chlorella pyrenoidosa.*

The thermophilic strains of *Chlorella pyrenoidosa* that can be employed in the instant process have globose cells, 3–5$\mu$, occasionally up to 11–13$\mu$ in diameter, with concave-spherical parietal chromatophores which almost cover the entire inner cell wall surfaces. The cells are pyrenoid distinct, and propagate by successive division, forming nonmotile autospores.

While the above strains of *Chlorella pyrenoidosa* are themselves useful in the practice of the invention, it has been found that irradiation of these strains results in the evolution of new strains capable of an even higher production of lutein. The strains are irradiated, e.g., for about 20 to about 50 minutes, with an ultraviolet lamp emitting ultraviolet radiation peaked at 2537 A. at a distance of about 2.5 inches from an algal cell suspension.

It has now been discovered that culturing the above algae in particular nutrient media results in the production of relatively high quantities of lutein, e.g., of the order of about 1 g. of lutein per gallon of culture.

Lutein is a known compound having high pigmenting value and low toxicity, and is particularly useful in pigmenting poultry, eggs, foodstuffs, feedstuffs, etc.

Processes for the production of carotenoids employing other strains of *Chlorella pyrenoidosa* are known to the art. However, the instant process achieves high yields of lutein in the absence of light, thus obviating the problems and expense of illumination, the attendant engineering problems involved in design, removal of heat from the lamps, prevention of contamination with other organisms, etc.

An important feature of the instant invention is the composition of the nutrient media for culturing the algae employed in the process of the invention. It has been found that certain ingredients in the nutrient media are essential for the obtaining of high yields of lutein. Additionally, other components of the media are preferred, although not essential.

The essential ingredients of the nutrient media are the following:

(1) A carbohydrate source. The carbohydrate source is preferably dextrose; more preferably dextrose plus cane or beet molasses; and most preferably dextrose plus citrus molasses or high-test cane invert molasses. Other sugars and sugar alcohols such as maltose, fructose, mannose, dextrin, mannitol, etc., can also be employed singly or in any combination, but they are less effective than the preferred sugars. The carbohydrate source is used in an amount ranging from about 1 to about 19 percent, preferably from about 2.5 to about 8 percent of the nutrient medium by weight. When a combination of molasses and dextrose is used, the molasses is employed in a concentration ranging from about 0.25 to about 4 percent, preferably about 0.5 to about 2 percent, and from about 1 to about 15 percent, preferably from about 4 to about 6 percent dextrose.

(2) Vitamin $B_1$ in an amount ranging from about 5 to about 40 mg. per liter of nutrient medium, preferably about 30 mg. per liter. The upper limit for vitamin $B_1$ is not critical, although quantities above 40 mg. per liter do not further increase the yields of lutein.

(3) A nitrogen source, e.g., urea, ammonium nitrate or chloride, guanidine or a guanidine salt, such as guanidine nitrate, carbonate, acetate, etc. The quantity of nitrogen source employed is in the range of from about 0.05 to about 0.7 percent, preferably about 0.35 percent by weight of nitrogen source, based on the weight of the nutrient medium. Guanidine or guanidine nitrate is preferred since in addition to providing a marked favorable shift in the ratio of lutein to total carotenoids in the product, it also exerts a mild antiseptic action in the nutrient medium which helps to inhibit the growth of undesirable contaminating organisms. This protecting action is particularly important during the early stage of the development of the algae, since the culture is then especially susceptible to the harmful effects of bacterial or fungal contamination.

(4) Magnesium in the form of a water-soluble organic or inorganic salt, e.g., magnesium sulfate, chloride, nitrate, acetate, etc., in a concentration ranging from about 0.02 g. to about 0.8 g. per liter, preferably from about 0.2 g. to about 0.3 g. of magnesium in the form of the magnesium ion per liter of medium.

(5) Potassium in the form of a water-soluble organic or inorganic salt, e.g., potassium nitrate, potassium acetate, potassium phosphate, etc. The amount of potassium ion can range from about 0.06 to about 3 g. per liter of medium.

(6) A water-soluble phosphate such as dipotassium phosphate, potassium dihydrogen phosphate, sodium phosphate, ammonium phosphate, etc. Potassium salts are preferred, since the potassium ion is essential and can advantageously be included as a phosphate salt. The concentration of phosphorus as phosphate ion can range from about 0.06 to about 2.5 g. per liter of nutrient medium. The most preferred form is a mixture of about 1.5 g. of monopotassium phosphate and about 1.5 g. of dipotassium phosphate per liter of medium.

Preferred ingredients include:

(1) An amino acid source. Amino acid sources that can be employed include one or more of lysine, glutamic acid, glycine, methionine, phenylalanine, aspartic acid, etc. A good source is a mixture of leucine, isoleucine, phenylalanine, tyrosine, methionine, and glutamic acid. The quantity of amino acid nitrogen present can range from about 0.05 to about 1.5 g., preferably from about 0.1 to about 0.4 g. of amino acid nitrogen per liter of nutrient medium.

(2) Methanol or ethanol ranging in quantity from about 0.05 to about 4 percent, preferably from about 0.2 to about 0.3 percent by weight of the nutrient medium.

(3) An acetate salt such as the acetate of sodium, potassium, calcium, magnesium, ferric, ammonium, etc.; or an acetate ester such as a lower alkyl ester, e.g., methyl acetate, isopropyl acetate, etc., preferably methyl acetate. Also, guanidine acetate can be employed, thus providing both a source of guanidine and a source of acetate. The acetate concentration employed is in the range of from about 0.2 to about 2 g. of acetate radical per liter of nutrient medium.

(4) Trace metals such as manganese, iron, zinc, molybdenum, boron, etc., ranging from about 0.5 to about 20 parts per million of trace element ion. These trace metals are used in the form of a salt which is water soluble to at least the above concentrations.

(5) Ethylene diamine tetraacetic acid as a sequestering agent to inhibit or prevent the formation of insoluble phosphate salts of magnesium, iron, manganese, zinc, etc., which render these cations not fully available to the algae. Other sequestering agents such as citric acid, lactic acid, gluconic acid, etc., can be employed, but ethylene diamine tetraacetic acid is preferred. The quantity of sequestering agent employed is in the range of from about 0.005 to about 0.150 g., preferably from about 0.05 to about 0.1 g., per liter of nutrient medium.

(6) Fumaric acid. Fumaric acid acts to increase the lutein content of the algal cells. Fumaric acid is preferably added with triethanolamine, which is used as a buffer therefor. The quantity of fumaric acid employed ranges from about 0.05 to about 2.0 g., based on the weight of nutrient medium.

The pH of the nutrient medium should be in the range of from about 4 to about 8.8, preferably in the range of from about 5.8 to about 8.5.

The proces of the invention is carried out by culturing one or more thermophilic strains of *Chlorella pyrenoidosa*, which are either UV irradiated or nonirradiated in a nutrient medium described above at a culture temperature in the range of from about 20 to about 42° C., preferably from about 30 to about 42° C. The fermentation is run in the dark and the incubation time ranges from about 2 to about 8 days, preferably from about 3 to about 5 days. It is advantageous to shake the culture during the incubation period. The algal cells produced by the process are then recovered from the culture as a dry powdery solid, e.g., by centrifugation followed by spray-drying to remove the residual water from the cells. The dried cells are recovered as a finely powdered nonhygroscopic deep green flour. The dried algal cells have a pleasant tasting vegetable soup odor, and a pleasant salty-spicy taste, and can be used directly for incorporation into feeds or foods. The dried cells have an additional advantage of having a nutrient value as well as being useful as a pigmenting agent. Purified lutein can be recovered from the dried cells, if desired, by extraction of the cells with a fat solvent, e.g., ethanol, acetone, petroleum ether, etc., followed by removal of the solvent, such as by evaporation or distillation.

In a preferred process of the invention, about 0.2 percent of guanidine is present in the nutrient medium originally, and after from about 48 to about 72 hours of incubation guanidine is added to the culture in a quantity of about 0.1 percent. Alternatively, the 0.1 percent guanidine can be added continuously during the entire incubation period or intermittently in two or more portions. It is also preferred to add the carbohydrate source portionwise during the fermentation. This portionwise addition is advantageous when amounts of carbohydrate in excess of 8 percent are employed, and is preferable with amounts of 8 percent or less; for example, from about 3 to about 6 percent carbohydrate source is added initially and from about 1 to about 4 percent thereafter in one or more portions during the course of the fermentation. Additionally, when more than 1 percent methanol or ethanol is employed, the additional quantities must be added portionwise during the fermentation.

Cultures of the organisms have been deposited in the collection of microorganisms, of the American Type Culture Collection, Washington, D.C., where they have been given the designations indicated in the examples below.

*Example 1*

A culture of *Chlorella pyrenoidosa* A119 Lagos strain, ATCC No. 14860 is grown on the following enriched agar medium having a pH adjusted to 6.7 with sodium hydroxide and having been sterilized at 120° C. for 20 minutes:

| Medium: | | |
|---|---|---|
| Technical glucose (cerelose) | grams per liter | 20.0 |
| Corn steep liquor | do | 1.0 |
| Monopotassium phosphate | do | 1.5 |
| Magnesium sulfate, anhydrous | do | 1.5 |
| Yeast autolyzate | do | 0.5 |
| Ammonium nitrate | do | 1.0 |
| 1(+)glutamic acid | do | 0.5 |
| Lactalbumin hydrolyzate | do | 1.0 |
| Zinc sulfate heptahydrate | mg | 10 |
| Agar | grams per liter | 15 |
| Distilled water | | Q.s. |

100 ml. of the above agar medium is placed in a 500 ml. Erlenmeyer flask, inoculated with 1 to 2 ml. of a suspension of the above high temperature strain of *Chlorella pyrenoidosa* taken from an agar slant, and the flask culture is incubated for 3 to 4 days at 35° C. Then the growth is washed off into 50 ml. of sterile water.

100 ml. quantities of nutrient medium of the following composition are placed in 500 ml. Erlenmeyer flasks and sterilized at 120° C. for 20 minutes:

| Medium: | | |
|---|---|---|
| Technical glucose (cerelose) | grams per liter | 60 |
| Invert blackstrap molasses | do | 7.5 |
| Ethanol [1] | do | 2.4 |
| Potassium nitrate | do | 2.0 |
| Mixed amino acids [2] | do | 3.0 |
| Guanidine nitrate [3] | do | 3.3 |
| Magnesium sulfate heptahydrate | do | 2.0 |
| Monopotassium phosphate | do | 1.5 |
| Dipotassium phosphate | do | 1.5 |
| Potassium acetate | do | .75 |
| 1-lysine monohydrochloride | do | .5 |
| Ethylene diamine tetraacetic acid disodium manganese | mg | 15 |
| Ethylene diamine tetraacetic acid disodium iron | mg | 15 |
| Thiamine hydrochloride | mg | 30 |

[1] 2.0 ml. added initially and 1.0 ml. added at 48 hours.
[2] A commercial product (Staley Co., Sta Mino Acids) containing leucine, isoleucine, tyrosine, glutamic acid, methionine and phenylalanine.
[3] 2.3 g. added initially and 1.0 g. added at 48 hours.

When cool, the flasks are inoculated with a cell suspension prepared as described above. The inoculated flasks are agitated at 35° C. on a rotary shaker. The flasks are incubated without illumination. After 96 hours of incubation in the dark, a cell dry weight of 28 grams per liter is obtained. 7.4 mg. of total carotenoids per gram of dry cells is present and a yield of 207 mg. of total carotenoids per liter of culture. 90 percent of the total carotenoids is lutein.

*Example 2*

The process of Example 1 is carried out except that the organism is *Chlorella pyrenoidosa* A118 Waco strain, ATCC No. 14859, and the culture medium is of the following composition:

| Medium: | Grams per liter |
|---|---|
| Cerelose | 40 |
| Invert blackstrap molasses | 7.5 |
| Ethanol [1] | 2.4 |
| Guanidine nitrate [2] | 3.4 |
| Mixed amino acids [3] | 2.0 |
| Potassium nitrate | 2.0 |
| Potassium acid phosphate | 1.5 |
| Dipotassium phosphate | 1.5 |
| Magnesium sulfate heptahydrate | 2.0 |
| Potassium acetate | 1.0 |
| Thiamine hydrochloride | 0.03 |
| Fumaric acid | 1.3 |
| Triethanolamine | 0.5 |
| Ethylene diamine tetraacetic acid (EDTA) | 0.100 |

Medium—Continued

| | Grams per liter |
|---|---|
| EDTA disodium manganese | 0.020 |
| EDTA disodium zinc | 0.020 |
| EDTA disodium iron | 0.015 |
| Boric acid | 0.010 |

[1] 2 ml. per liter added before sterilization and 1 ml./l. added after 48 hours.
[2] 2.3 grams per liter added before sterilization and 1.1 g./l. added after 48 hours.
[3] Contains leucine, isoleucine, phenylalanine, tyrosine, methionine and glutamic acid.

The above culture is incubated at 38° C. for 120 hours, and the dry cells isolated as in Example 1. The yield obtained is 25.0 grams of dry cell weight containing 9.8 mg./gm. of total pigments, of which 8.5 mg./gm. is lutein and 1.3 mg./gm. is carotenes, of which about 90 percent is β-carotene.

*Example 3*

The process of Example 1 is carried out except that the organism is *Chlorella pyrenoidosa* 30 L/24 strain, ATCC No. 14853, which is a UV irradiated strain, and the culture medium is of the following composition:

Medium:

| | | |
|---|---|---|
| Cerelose (technical glucose) | grams per liter | 40.0 |
| High test blackstrap molasses (invert) | do | 7.5 |
| Mixed amino acids [1] | do | 2.0 |
| Guanidine nitrate | do | 3.3 |
| Potassium acetate | do | 1.0 |
| Potassium phosphate, monobasic | do | 1.5 |
| Potassium phosphate, dibasic | do | 1.5 |
| Potassium nitrate | do | 2.0 |
| Magnesium sulfate, anhydrous | do | 2.0 |
| Fumaric acid | do | 1.3 |
| Ethanol | do | 2.4 |
| Triethanolamine | do | .5 |
| Thiamine hydrochloride | mg | 30 |
| Micronutrients | | (2) |

[1] A. E. Staley Mfg. Co.; contains a mixture of leucine, isoleucine, tyrosine, glutamic acid, methionine and phenylalanine.
[2] The micronutrients and their concentrations per liter of medium are as follows: boric acid 10 mg., ethylene diamine tetraacetic acid (EDTA) 100 mg., sodium ferric EDTA 15 mg., disodium manganous EDTA 10 mg., disodium zinc 20 mg.

The pH is adjusted prior to sterilization to pH 6.9. The guanidine nitrate is added in an initial quantity of 2.3 g./liter and 1.0 g./liter is added after 48 hours of the fermentation. A series of 500 ml. Erlenmeyer flasks, each containing 50 ml. of the above nutrient medium, are inoculated with 1 ml. of algal cell suspension. The inoculated flasks are placed on a rotary shaker and agitated for 120 hours at a temperature ranging between 38° C. and 40° C.

Flasks are removed periodically during the fermentation to determine cell growth and carotenoid production. The following table shows the assay of these flasks.

TABLE

| Flask No. | Hours of Fermentation | Cell Dry Wt., mg./liter | Carotenoid Concentration, mg./mg. of Dry Wt. | Total Carotenoids, mg./liter of Culture | Lutein Content, mg./liter of Culture |
|---|---|---|---|---|---|
| 1 | 48 | 7.3 | 2.0 | 15 | 13 |
| 2 | 48 | 8.8 | 3.8 | 33 | 29 |
| 3 | 48 | 9.5 | 4.5 | 42 | 37 |
| 4 | 72 | 26.7 | 6.8 | 182 | 158 |
| 5 | 72 | 26.2 | 7.3 | 193 | 168 |
| 6 | 72 | 28.0 | 6.9 | 193 | 168 |
| 7 | 96 | 29.6 | 7.3 | 216 | 188 |
| 8 | 96 | 25.1 | 8.6 | 215 | 186 |
| 9 | 96 | 25.2 | 8.8 | 222 | 194 |
| 10 | 120 | 26.6 | 8.6 | 228 | 200 |
| 11 | 120 | 25.0 | 9.1 | 228 | 198 |
| 12 | 120 | 25.8 | 8.7 | 226 | 195 |

As can be seen from the table, only 72 hours are needed to produce very high carotenoid yields.

*Examples 4–8*

The process of Example 1 is carried out except that the following algae are employed:

| Example | Algae | ATCC Culture Number | Lutein Yield, mg./l. |
|---|---|---|---|
| 4 | *Chlorella pyrenoidosa* | ATCC No. 14854 30L/24/43. | 169 |
| 5 | *Chlorella pyrenoidosa* | ATCC No. 14855 30L/24/85. | 139 |
| 6 | *Chlorella pyrenoidosa* | ATCC No. 14856 30L/24/86. | 207 |
| 7 | *Chlorella pyrenoidosa* | ATCC No. 14857 30L/24/96. | 235 |
| 8 | *Chlorella pyrenoidosa* | ATCC No. 14858 30L/24/102. | 218 |

We claim:

1. A process for the production of lutein comprising the steps of culturing in the absence of illumination a thermophilic strain of *Chlorella pyrenoidosa* which grows at 38° C. in an aqueous medium comprising a carbohydrate source, from about 5 to about 40 mg./liter of vitamin $B_1$, guanidine or a salt thereof, the magnesium ion, the phosphate ion, and the potassium ion, at a temperature in the range of from about 20 to about 42° C. and recovering dry cells from the culture medium.

2. A process according to claim 1 wherein lutein is recovered from the algal cells.

3. A process according to claim 1 wherein the nutrient medium contains an amino acid.

4. A process according to claim 1 wherein the culture medium contains traces of iron, zinc, molybdenum, manganese, and boron.

5. A process according to claim 4 wherein the nutrient medium contains an alcohol selected from the group consisting of methanol and ethanol, a compound selected from the group consisting of an acetate salt and an acetate ester, and a compound selected from the group consisting of ethylene diamine tetraacetic acid and salts thereof.

6. A process according to claim 5 wherein the nutrient medium also contains fumaric acid.

7. An aqueous nutrient medium for the culturing in the absence of illumination of a thermophilic strain of *Chlorella pyrenoidosa* which grows at 38° C. comprising water, from 1 to about 19 percent by weight of a carbohydrate; from about 5 to about 40 mg./liter of vitamin $B_1$; from about 0.05 to about 0.7 percent of guanidine or a salt thereof; from about 0.02 to about 0.8 g./liter of magnesium ion, from about 0.06 to about 3 g./liter of potassium ion, and from about 0.06 to about 2.5 g./liter of phosphate ion.

8. A nutrient medium according to claim 7 which contains in addition from about 0.05 to about 1.5 g. of amino acid nitrogen per liter; from about 0.05 to about 4 percent of an alcohol selected from the group consisting of methanol and ethanol; from about 0.2 to about 2 g. of acetate radical per liter; from 0.5 to about 20 parts per million each of manganese, iron, zinc, molybdenum and boron; and from about 0.005 to about 0.150 g./liter of ethylene diamine tetraacetic acid.

References Cited by the Examiner

UNITED STATES PATENTS 2,949,700 8/1960 Kathrein ---------- 99—2

(Other references on following page)

OTHER REFERENCES

Burlew, Algal Culture From Laboratory to Pilot Plant, Carnegie Institution of Washington Publication 600, Washington, D.C., 1953, pp. 45, 51, 134 and 135.

Chemical Abstracts (C.A.), vol. 53, No. 15, p. 14244e, August 10, 1959.

Science, vol. 117, pp. 330–1, March 20, 1953.

Seiden et al. Feedstuffs, p. 533, Springer Publishing Co., Inc., New York, N.Y. (1957).

A. LOUIS MONACELL, *Primary Examiner.*

D. J. DONOVAN, *Assistant Examiner.*